United States Patent
Kang et al.

(10) Patent No.: US 9,602,048 B2
(45) Date of Patent: Mar. 21, 2017

(54) PHOTOVOLTAIC MODULE

(71) Applicant: LG ELECTRONICS INC., Seoul (KR)

(72) Inventors: Younjong Kang, Seoul (KR); Myonghwan Kim, Seoul (KR); Myungsoo Ham, Seoul (KR); Wontae Ham, Seoul (KR); Giyob Park, Seoul (KR); Byoungsu Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 14/479,179

(22) Filed: Sep. 5, 2014

(65) Prior Publication Data

US 2015/0200623 A1 Jul. 16, 2015

(30) Foreign Application Priority Data

Jan. 15, 2014 (KR) ........................ 10-2014-0005264
Jan. 20, 2014 (KR) ........................ 10-2014-0006814

(51) Int. Cl.
*G05F 1/00* (2006.01)
*H02M 3/335* (2006.01)
(Continued)

(52) U.S. Cl.
CPC ................ *H02S 40/32* (2014.12); *H02J 7/35* (2013.01); *H02M 1/14* (2013.01); *H02M 3/335* (2013.01);
(Continued)

(58) Field of Classification Search
CPC .. G05F 1/613; G05F 1/66; G05F 1/67; H02M 7/4807; H02M 7/493; H02M 1/088; H02M 2007/4822
(Continued)

(56) References Cited

U.S. PATENT DOCUMENTS 6,576,830 B2 * 6/2003 Nagao ..................... H02S 20/23
136/244
2010/0084924 A1 * 4/2010 Frolov .............. H01L 31/02021
307/82
(Continued)

FOREIGN PATENT DOCUMENTS

EP 1 837 985 A2 9/2007
EP 2 621 075 A2 7/2013
WO WO 2013/064828 A1 5/2013

OTHER PUBLICATIONS

Gao et al., "Research on Output Current of Interleaved-flyback in Boundary Conduction Mode for Photovoltaic AC Module Application," Energy Conversion Congress and Exposition (ECCE), Sep. 17, 2011, pp. 770-775, XP-032067242.

*Primary Examiner* — Adolf Berhane
*Assistant Examiner* — Gary Nash
(74) *Attorney, Agent, or Firm* — Birch, Stewart, Kolasch & Birch, LLP

(57) ABSTRACT

A photovoltaic module is discussed. The photovoltaic module includes a solar cell module including a plurality of solar cells and a junction box attached to a rear surface of the solar cell module, the junction box including a power conversion module to convert direct current (DC) voltage supplied from the solar cell module into alternating current (AC) voltage and to output the AC voltage, wherein the power conversion module included at least one bypass diode to receive the DC voltage from the solar cell module, a converter unit to power-convert the DC voltage from the at least one bypass diode, the converter unit including at least three interleaving converters, a capacitor to store voltage output from the converter unit, and an inverter unit to output the AC voltage using the voltage stored in the capacitor. Consequently, it is possible to stably output AC voltage.

16 Claims, 15 Drawing Sheets

(51) Int. Cl.
      H02J 1/10      (2006.01)
      H02S 40/32     (2014.01)
      H02S 40/34     (2014.01)
      H02J 7/35      (2006.01)
      H02M 1/14      (2006.01)
      H02M 7/493     (2007.01)
      H02M 7/5387    (2007.01)
(52) U.S. Cl.
      CPC ......... *H02M 7/493* (2013.01); *H02M 7/5387* (2013.01); *H02S 40/34* (2014.12); *Y02E 10/56* (2013.01)
(58) Field of Classification Search
      USPC ....... 323/241, 267, 269, 271, 282–285, 906; 363/21.12–21.18, 65
      See application file for complete search history.

(56) References Cited

U.S. PATENT DOCUMENTS

| | | | |
|---|---|---|---|
| 2011/0249474 A1 | 10/2011 | Luo | |
| 2012/0262948 A1* | 10/2012 | Lee | H02S 40/34 363/16 |
| 2012/0325288 A1* | 12/2012 | Jang | H02S 40/345 136/246 |
| 2013/0121038 A1* | 5/2013 | Ryu | H02M 7/4807 363/21.14 |
| 2013/0193775 A1* | 8/2013 | Lee | H02J 5/00 307/151 |
| 2014/0070614 A1* | 3/2014 | Lo | H02J 3/385 307/43 |

* cited by examiner (a)

(b)

(c)

(d)

PHOTOVOLTAIC MODULE

CROSS-REFERENCE TO RELATED APPLICATION

This application claims the priority benefit of Korean Patent Application Nos. 10-2014-0005264, filed on Jan. 15, 2014 and 10-2014-0006814, filed on Jan. 20, 2014 in the Korean Intellectual Property Office, the disclosure of which is incorporated herein by reference.

BACKGROUND OF THE INVENTION

1. Field of the Invention

The embodiments of the invention relate to photovoltaic module and, more particularly, to a photovoltaic module that is capable of stably outputting alternating current (AC) voltage.

2. Description of the Related Art

In recent years, exhaustion of existing energy resources, such as petroleum and coal, has been forecast with the result that interest in alternative energy resources substituting for the existing energy resources has risen. Among such alternative energy resources is a solar cell that directly converts photovoltaic energy into electrical energy using a semiconductor device, which is in the spotlight as a next-generation cell.

A photovoltaic module includes a plurality of solar cells connected in series or in parallel to each other for photovoltaic power generation. The photovoltaic module may include a junction box to collect electricity produced by the solar cells.

SUMMARY OF THE INVENTION

It is an object of the embodiments of the invention to provide a photovoltaic module that is capable of stably outputting alternating current (AC) voltage.

In accordance with an aspect of the embodiment of the invention, the above and other objects can be accomplished by the provision of a photovoltaic module including a solar cell module including a plurality of solar cells and a junction box attached to a rear surface of the solar cell module, the junction box including a power conversion module to convert direct current (DC) voltage supplied from the solar cell module into AC voltage and to output the AC voltage, wherein the power conversion module included at least one bypass diode to receive the DC voltage from the solar cell module, a converter unit to power-convert the DC voltage from the at least one bypass diode, the converter unit including at least three interleaving converters, a capacitor to store voltage output from the converter unit, and an inverter unit to output the AC voltage using the voltage stored in the capacitor.

In accordance with another aspect of the embodiment of the invention, there is provided a photovoltaic module including a solar cell module including a plurality of solar cells and a junction box attached to a rear surface of the solar cell module, the junction box including a power conversion module to power-convert DC voltage supplied from the solar cell module and to output the power-converted DC voltage, wherein the power conversion module includes at least one bypass diode to receive the DC voltage from the solar cell module, a converter unit to convert the DC voltage from the at least one bypass diode, the converter unit including a plurality of interleaving converters, and a controller to control the converter unit, and wherein the controller changes switching periods of switching devices of the interleaving converters.

BRIEF DESCRIPTION OF THE DRAWINGS

The above and other objects, features and other advantages of the embodiment of the invention will be more clearly understood from the following detailed description taken in conjunction with the accompanying drawings, in which.

DETAILED DESCRIPTION OF THE EMBODIMENTS

Reference will now be made in detail to the example embodiments of the invention, examples of which are illustrated in the accompanying drawings.

The terms "module" and "unit," when attached to the names of components are used herein to help the understanding of the components and thus they should not be considered as having specific meanings or roles. Accordingly, the terms "module" and "unit" may be used interchangeably.

Figure 1:
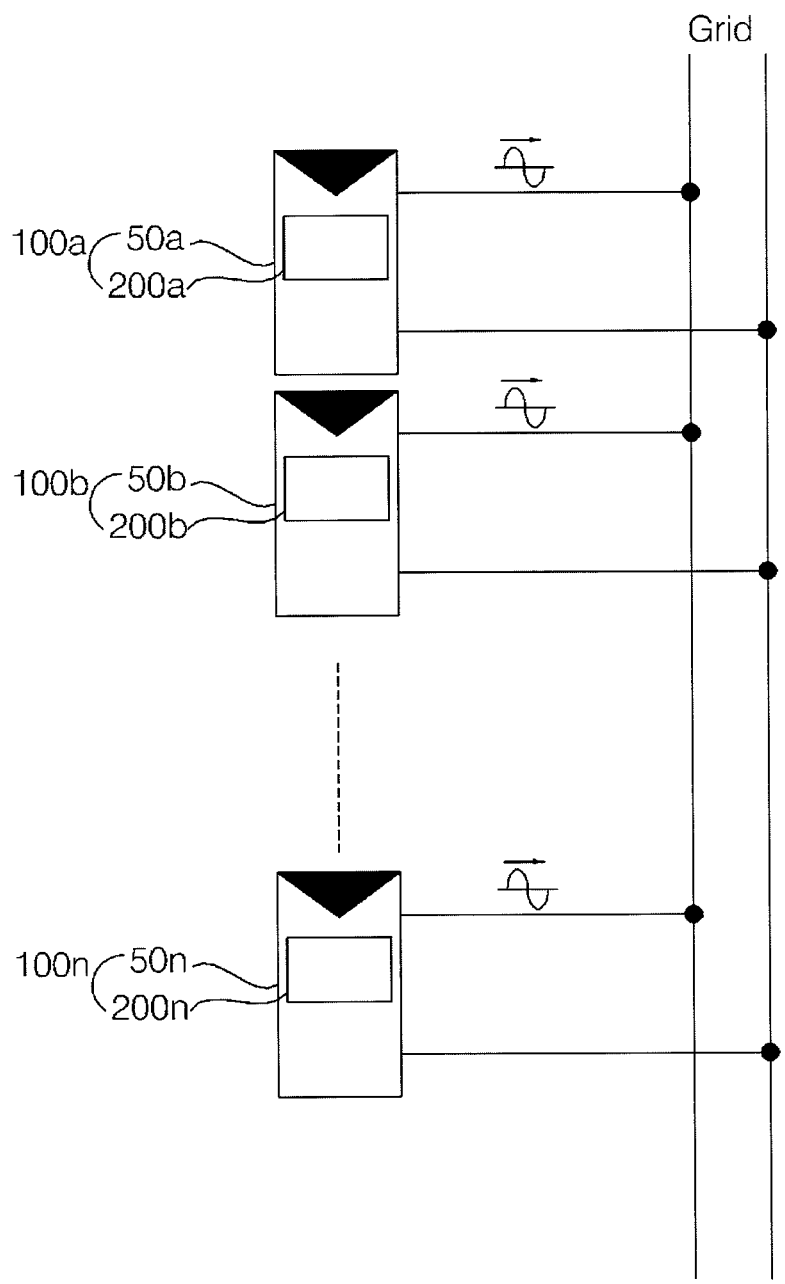
FIG. 1 is a view showing an example of the construction of a photovoltaic system according to an embodiment of the invention.

FIG. 1 is a view showing an example of the construction of a photovoltaic system according to an embodiment of the invention.

Referring to FIG. 1, the photovoltaic system 10 according to the embodiment of the invention may include a plurality of photovoltaic modules 50a, 50b, . . . , and 50n.

Each of the photovoltaic modules 50a, 50b, . . . , and 50n may respectively include solar cell modules 100a, 100b, . . . , and 100n, each of which includes a plurality of solar cells, to generate direct current (DC) voltage and junction boxes 200a, 200b, . . . , and 200n attached to rear surfaces of the solar cell modules 100a, 100b, . . . , and 100n to convert the DC voltage generated by the solar cell modules 100a, 100b, . . . , and 100n into alternating current (AC) voltage and to output the converted AC voltage.

The junction boxes 200a, 200b, . . . , and 200n each may include a power conversion module 700 (see FIG. 6) to convert the DC voltage generated by the solar cell modules 100a, 100b, . . . , and 100n into AC voltage and to output the converted AC voltage.

The power conversion module 700 (see FIG. 6) may include bypass diodes Da, Db, and Dc, a converter unit 530 (see FIG. 6), and an inverter unit 540 (see FIG. 6) disposed on a circuit board. For this reason, the power conversion module 700 (see FIG. 6) may be referred to as a micro inverter.

In the embodiment of the invention, on the other hand, the photovoltaic modules 50a, 50b, . . . , and 50n may directly output AC voltage through the solar cell modules 100a, 100b, . . . , and 100n and the junction boxes 200a, 200b, . . . , and 200n. For this reason, the photovoltaic modules 50a, 50b, . . . , and 50n may be referred to as photovoltaic AC modules.

In the structure as described above, the micro inverter to output AC voltage is attached to each of the solar cell modules 100a, 100b, . . . , and 100n. Even when output power of any one of the solar cell modules 100a, 100b, . . . , and 100n is lowered, therefore, the generated AC voltage may be supplied to a grid since the photovoltaic modules 50a, 50b, . . . , and 50n are connected in parallel to one another.

Unlike a string mode in which the photovoltaic modules 50a, 50b, . . . , and 50n are connected in series to one another, the photovoltaic modules 50a, 50b, . . . , and 50n independently generate and output AC voltage. In addition, the photovoltaic modules 50a, 50b, . . . , and 50n may stably output AC voltage to the grid irrespective of output of AC voltage from other photovoltaic modules since the photovoltaic modules 50a, 50b, . . . , and 50n are connected in parallel to one another.

In the embodiment of the invention, on the other hand, the converter unit 530 (see FIG. 6) may include a plurality of interleaving converters to output AC voltage of about 290 W to 330 W. In particular, at least three converters may perform interleaving operation.

In particular, the volume of an inductor and a transformer used in the converter unit 530 (see FIG. 6) is large. In an instance which the size of the inductor and the transformer is decreased, therefore, the capacity of the converter unit 530 (see FIG. 6) is reduced with the result that it may not be possible to output desired power.

For example, when two interleaving conductors are used, it is necessary for the inductor and the transformer to have a considerably large size in order to output AC voltage of about 290 W to 330 W as described above. As the size of the inductor and the transformer is increased, it is necessary to increase the thickness of the junction box. The thickness of the junction box may be greater than that of a frame 105 (see FIG. 3) of the solar cell module 100.

In order to solve the above problem, in the embodiment of the invention, three or more interleaving converters are used. In this instance, the size of the inductor and the transformer used to output AC voltage of about 290 W to 330 W as described above may be reduced and, therefore, the thickness of the junction box may be less than that of the frame 105 (see FIG. 3) of the solar cell module 100, which will hereinafter be described in detail with reference to FIG. 6 and the following drawings.

Figure 2:
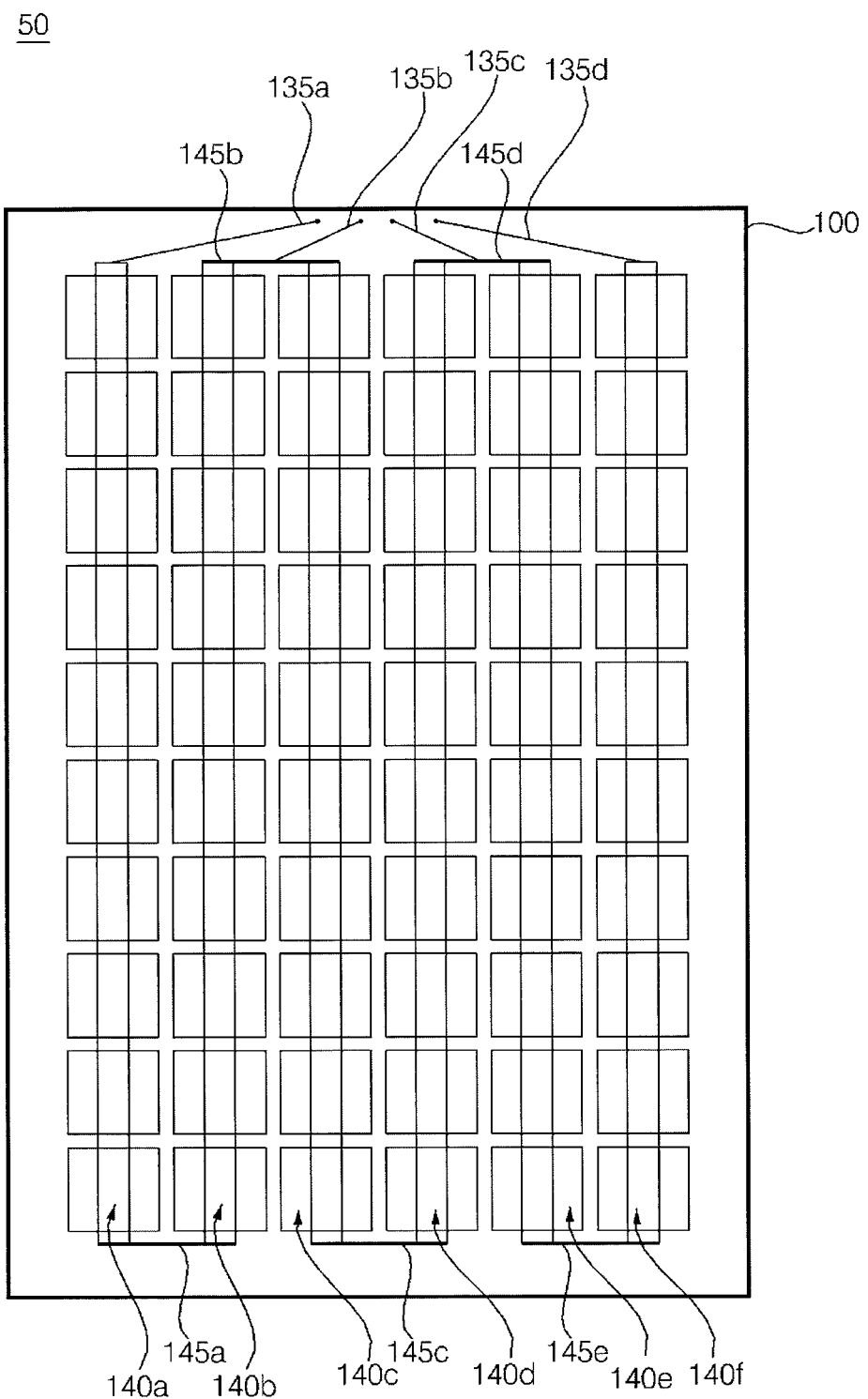
FIG. 2 is a front view showing a photovoltaic module according to an embodiment of the invention.
Figure 3:
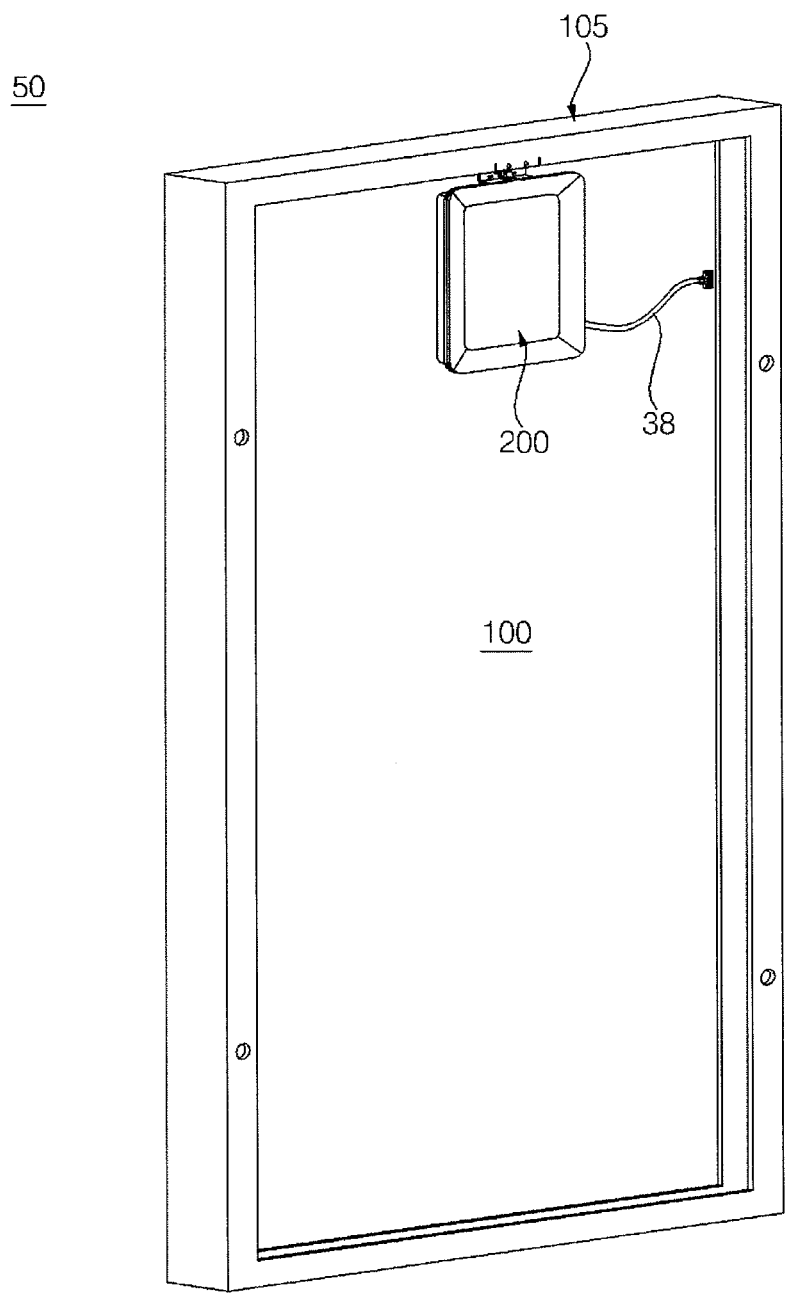
FIG. 3 is a rear view showing the photovoltaic module of FIG. 2.
Figure 4:
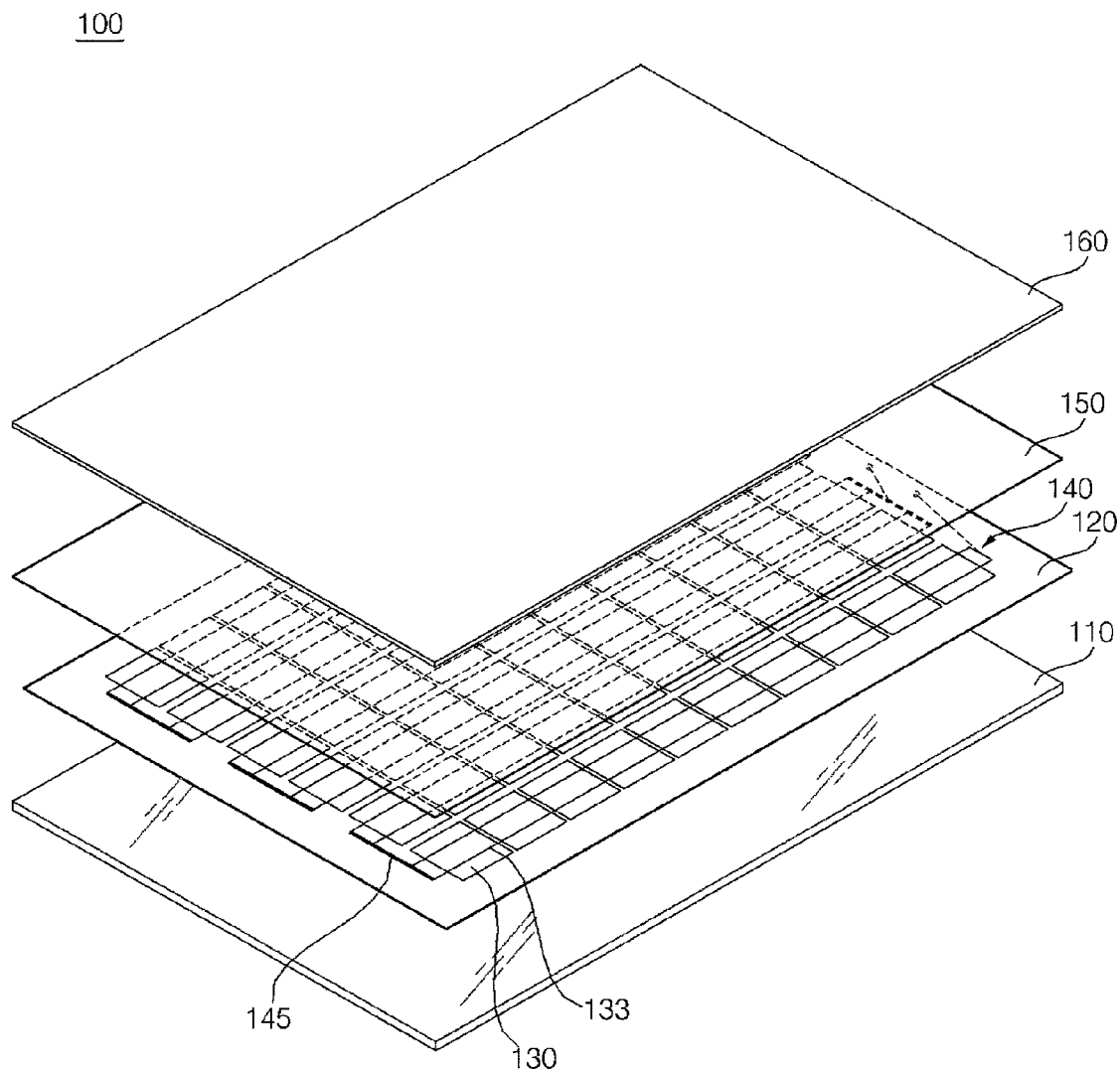
FIG. 4 is an exploded perspective view of a solar cell module shown in FIG. 2.

FIG. 2 is a front view showing a photovoltaic module according to an embodiment of the invention, FIG. 3 is a rear view showing the photovoltaic module of FIG. 2 and FIG. 4 is an exploded perspective view of a solar cell module shown in FIG. 2.

Referring to FIGS. 2 to 4, the photovoltaic module 50 according to the embodiment of the invention includes a solar cell module 100 and a junction box 200 disposed at one surface of the solar cell module 100. In addition, the photovoltaic module 50 may further include a heat dissipation member disposed between the solar cell module 100 and the junction box 200.

The solar cell module 100 may include a plurality of solar cells 130. In addition, the solar cell module 100 may further include a first sealing member 120 disposed at the lower surface of each of the solar cells 130, a second sealing member 150 disposed at the upper surface of each of the solar cells 130, a rear substrate 110 disposed at the lower surface of the first sealing member 120, and a front substrate 160 disposed at the upper surface of the second sealing member 150.

Each of the solar cells 130 is a semiconductor device to convert solar energy into electrical energy. A silicon solar cell, a compound semiconductor solar cell, a tandem solar cell, a dye-sensitized solar cell, CdTe type solar cell, or a CIGS type solar cell may be used as each of the solar cells 130.

Each of the solar cells 130 has a light receiving surface on which solar light is incident and a back surface opposite to the light receiving surface. For example, each of the solar cells 130 includes a first conductive type silicon substrate, a second conductive type semiconductor layer formed on the silicon substrate, the second conductive type being opposite to the first conductive type, and at least one opening through which a portion of the second conductive type semiconductor layer is exposed. In addition, each of the solar cells 130 may further include an anti-reflection film formed on the second conductive type semiconductor layer, a front electrode contacting the portion of the second conductive type semiconductor layer exposed through the at least one opening, and a rear electrode formed at the rear surface of the silicon substrate.

The solar cells 130 may be electrically connected in series or in parallel to each other. Specifically, the solar cells 130 may be electrically connected to each other via ribbons 133. Each of the ribbons 133 may be bonded to the front electrode formed on the light receiving surface of one of the solar cells 130 and the rear electrode formed on the back surface of another adjacent one of the solar cells 130.

Referring to FIGS. 2 to 4, the ribbons 133 are arranged in two rows and the solar cells 130 are connected in a line by the ribbons 133 to form one solar cell string 140. As shown in FIGS. 2 to 4, six solar cell strings 140a, 140b, 140c, 140d, 140e, and 140f are formed and each of the solar cell strings includes 10 solar cells. However, various modifications are also possible unlike FIGS. 2 to 4.

Meanwhile, the solar cell strings may be electrically connected to one another via bus ribbons. Referring to FIG. 2, electrical connection between the first solar cell strings 140a and the second solar cell strings 140b, between the third solar cell strings 140c and the fourth solar cell strings 140d, and between the fifth solar cell strings 140e and the sixth solar cell strings 140f is achieved by bus ribbons 145a, 145c, and 145e disposed at the lower part of the solar cell module 100, respectively. In addition, as shown in FIG. 2, electrical connection between the second solar cell strings 140b and the third solar cell strings 140c and between the fourth solar cell strings 140d and the fifth solar cell strings 140e is achieved by bus ribbons 145b and 145d disposed at the upper part of the solar cell module 100, respectively.

On the other hand, the ribbon connected to the first solar cell string, the bus ribbons 145b and 145d, and the ribbon connected to the fourth solar cell string are electrically connected to first to fourth conductive lines 135a, 135b, 135c, and 135d, respectively. The first to fourth conductive lines 135a, 135b, 135c, and 135d are connected to bypass diodes Da, Db, and Dc (see FIG. 6) in the junction box 200 disposed at the rear surface of the solar cell module 100. As shown in FIG. 2, the first to fourth conductive lines 135a, 135b, 135c, and 135d extend to the rear surface of the solar cell module 100 through an opening formed at the solar cell module 100.

Meanwhile, the junction box 200 may be disposed more adjacent to one end of the solar cell module 100 to which the conductive lines extend.

As shown in FIGS. 2 and 3, the first to fourth conductive lines 135a, 135b, 135c, and 135d extend from the upper part of the solar cell module 100 to the rear surface of the solar cell module 100. As a result, the junction box 200 is disposed at the upper part of the rear surface of the solar cell module 100. Consequently, it is possible to reduce the length of the conductive lines, thereby reducing power loss.

The rear substrate 110 is a back sheet having waterproof, insulation, and ultraviolet protection functions. For example, the rear substrate 110 may be a Tedlar/PET/Tedlar (TPT) type substrate. However, the embodiment of the invention is not limited thereto. In addition, the rear substrate 110 is formed in a rectangular shape as shown in FIG. 4. However, the rear substrate 110 may be formed in various shapes, such as a circular shape and a semi-circular shape, according to an environment in which the solar cell module 100 is installed.

Meanwhile, the first sealing member 120 may be attached to the rear substrate 110 in a state in which the first sealing member 120 has the same size as the rear substrate 110. The solar cells 130 may be arranged on the first sealing member 120 in a state in which the solar cells 130 are adjacent to one another to form several lines.

The second sealing member 150 may be bonded to the first sealing member 120 by lamination in a state in which the second sealing member 150 is disposed on solar cells 130.

Elements of the solar cells are chemically combined with one another by the first sealing member 120 and the second sealing member 150. For example, the first sealing member 120 and the second sealing member 150 may be made of ethylene vinyl acetate (EVA) film.

On the other hand, the front substrate 160 may be disposed on the second sealing member 150 to transmit solar light. For example, the front substrate 160 may be made of reinforced glass to protect the solar cells 130 from external impact. In another example, the front substrate 160 may be made of low-iron reinforced glass to prevent reflection of solar light and to improve transmittance of the solar light.

The junction box 200 may be attached to the rear surface of the solar cell module 100. The junction box 200 may perform power conversion using DC voltage supplied from the solar cell module 100. Specifically, the junction box 200 may include a power conversion module 700 to convert DC voltage into AC voltage and to output the converted AC voltage.

The power conversion module 700 may include bypass diodes Da, Db, and Dc, a converter unit 530 (see FIG. 6), and an inverter unit 540 (see FIG. 6) disposed on a circuit board. For this reason, the power conversion module 700 may be referred to as a micro inverter.

Meanwhile, the interior of the junction box 200 may be coated with silicone to prevent permeation of moisture into circuit devices in the junction box 200.

The junction box 200 may have an opening, through which the first to fourth conductive lines 135a, 135b, 135c, and 135d are connected to the bypass diodes Da, Db, and Dc (see FIG. 6) in the junction box 200.

An AC output cable 38 to output the converted AC voltage to the outside may be connected to one side of the junction box 200.

The photovoltaic module 50 may include a frame 105 to fix the edge of the solar cell module 100. Meanwhile, the thickness of the junction box 200 may be less than that of the frame 105 such that the junction box 200 does not protrude from the rear surface solar cell module 100.

Figure 5:
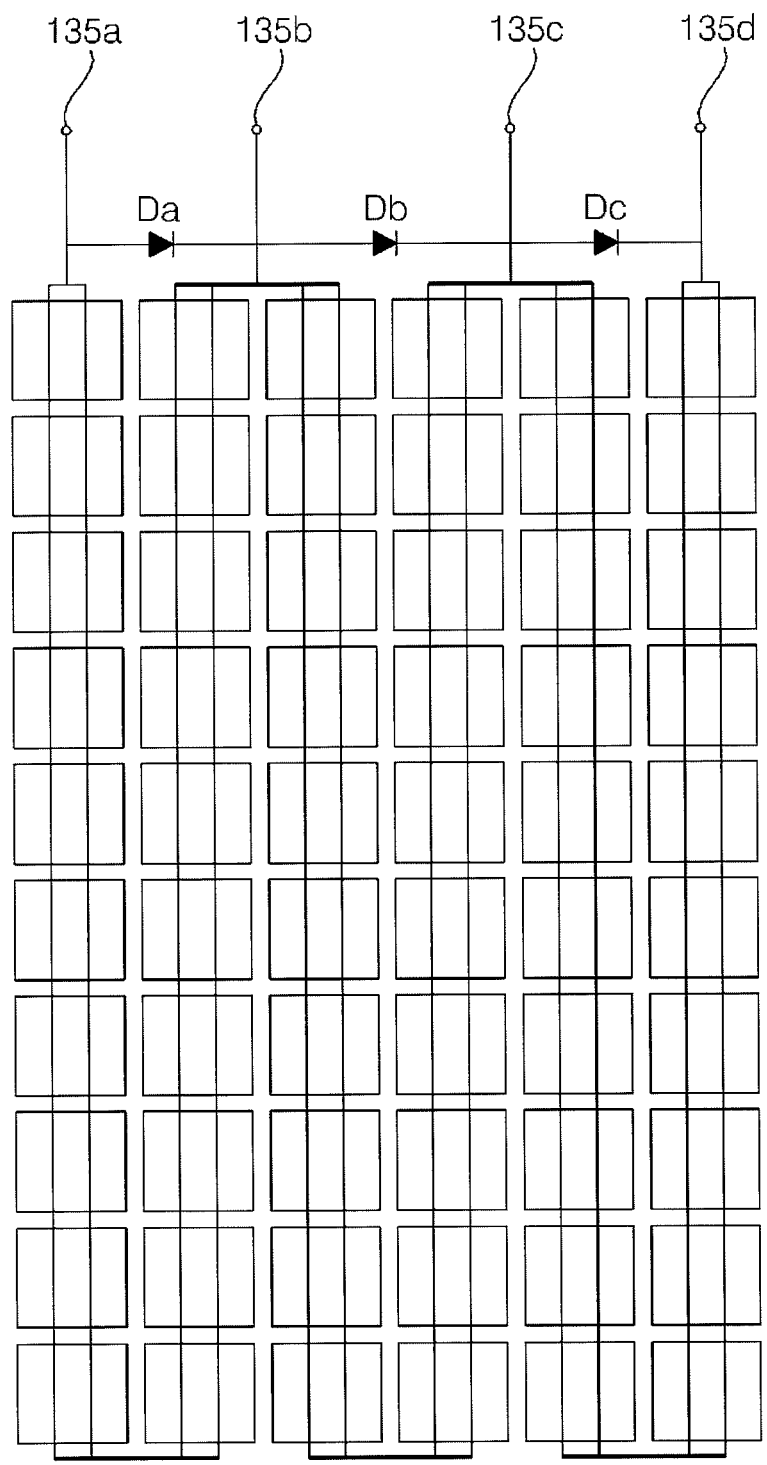
FIG. 5 is a view showing an example of the construction of bypass diodes of the photovoltaic module of FIG. 2.

FIG. 5 is a view showing an example of the construction of bypass diodes of the photovoltaic module of FIG. 2.

Referring to FIG. 5, bypass diodes Da, Db, and Dc may be connected to the six solar cell strings 140a, 140b, 140c, 140d, 140e, and 140f. Specifically, the first bypass diode Da is connected between the first solar cell string 140a and the first bus ribbon 145a to bypass the first solar cell string 140a and the second solar cell string 140b when inverse voltage is generated in the first solar cell string 140a or the second solar cell string 140b.

For example, when voltage of about 0.6 V is generated by a normal solar cell, potential of a cathode of the first bypass diode Da is higher by about 12 V (=0.6 V*20) than that of an anode of the first bypass diode Da. Consequently, the first bypass diode Da performs a normal operation other than a bypassing operation.

When any one solar cell of the first solar cell string 140a is shaded, foreign matter is attached to the corresponding solar cell, or hot spot is generated in the corresponding solar cell, on the other hand, voltage of about 0.6 V is not generated by the corresponding solar cell but inverse voltage (about −15 V) is generated by the corresponding solar cell. As a result, the potential of the anode of the first bypass diode Da is higher by about 15 V than that of the cathode of the first bypass diode Da. Consequently, the first bypass diode Da performs the bypassing operation and, therefore, voltage generated by the solar cells in the first solar cell string 140a and the second solar cell string 140b is not supplied to the junction box 200. When inverse voltage is generated by some solar cells as described above, the bypassing operation is performed to prevent breakdown of the corresponding solar cells. In addition, it is possible to supply DC voltage generated by the solar cells excluding the solar cells having the hot spot regions as described above.

The second bypass diode Db is connected between the first bus ribbon 145a and the second bus ribbon 145b to bypass the third solar cell string 140c and the fourth solar cell string 140d when inverse voltage is generated in the third solar cell string 140c or the fourth solar cell string 140d.

The third bypass diode Dc is connected between the second bus ribbon 145b and the sixth solar cell string 140f to bypass the fifth solar cell string 140e and the sixth solar cell string 140f when inverse voltage is generated in the fifth solar cell string 140e or the sixth solar cell string 140f.

On the other hand, six bypass diodes may be connected to the six solar cell strings unlike FIG. 5. Various other modifications are also possible.

Figure 6:
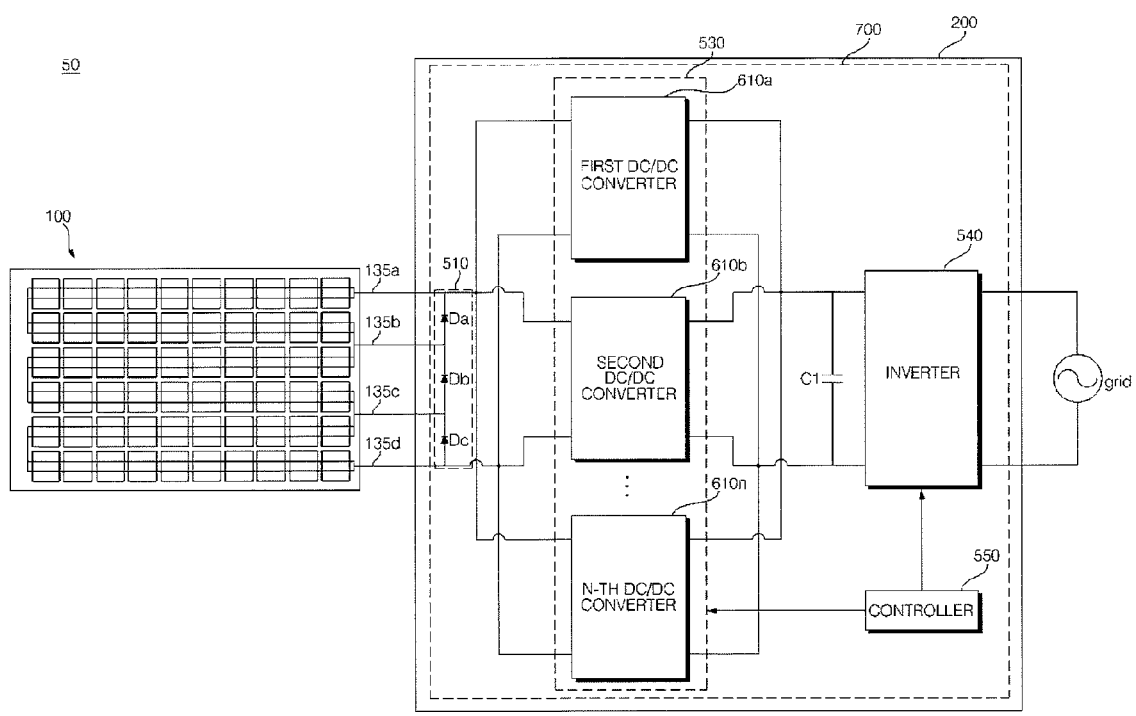
FIG. 6 is a block diagram of an example of a power conversion module in a junction box shown in FIG. 2.

FIG. 6 is a block diagram of an example of the power conversion module in the junction box shown in FIG. 2.

Referring to FIG. 6, the power conversion module 700 in the junction box may include a bypass diode unit 510, a converter unit 530, a capacitor C1, an inverter unit 540, and a controller 550.

The bypass diode unit 510 may include bypass diodes Da, Db, and Dc respectively disposed between the first to fourth conductive lines 135a, 135b, 135c, and 135d of the solar cell module 100. The number of the bypass diodes may be at least one but may be less by one than that of the conductive lines.

The bypass diodes Da, Db, and Dc receive photovoltaic DC voltage from the solar cell module 100, particularly from the first to fourth conductive lines 135a, 135b, 135c, and 135d of the solar cell module 100. When voltage received from at least one of the first to fourth conductive lines 135a, 135b, 135c, and 135d is inverse voltage, the bypass diodes Da, Db, and Dc bypass the solar cells corresponding thereto.

Input voltage Vpv passing through the bypass diode unit 510 is input to the converter unit 530.

The converter unit 530 converts the input voltage Vpv output from the converter unit 530. For this reason, the converter unit 530 may be referred to as a first power conversion unit.

Figure 8A:
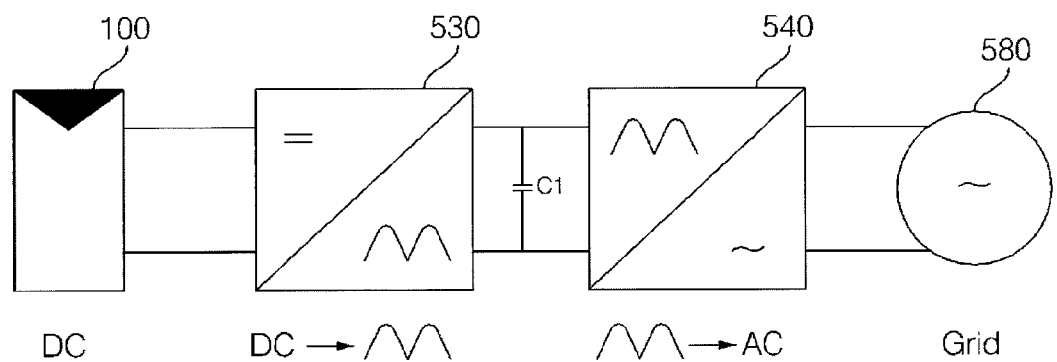
FIGS. 8A and 8B are views illustrating an operation method of the power conversion module of FIG. 6.

For example, as shown in FIG. 8A, the converter unit 530 may convert the input voltage Vpv into pseudo DC voltage. As a result, the pseudo DC voltage may be stored in the capacitor C1. For this reason, opposite ends of the capacitor C1 may be referred to as DC ends and the capacitor C1 may be referred to as a DC end capacitor.

In another example, as shown in FIG. 8A, the converter unit 530 may convert the input voltage Vpv into DC voltage through boosting. As a result, the boosted DC voltage may be stored in the DC end capacitor C1.

The inverter unit 540 may convert the DC voltage stored in the DC end capacitor C1 into AC voltage. For this reason, the inverter unit 540 may be referred to as a second power conversion unit.

For example, the inverter unit 540 may convert the pseudo DC voltage converted by the converter unit 530 into AC voltage.

In another example, the inverter unit 540 may convert the DC voltage boosted by the converter unit 530 into AC voltage.

Meanwhile, the converter unit 530 may include a plurality of interleaving converters for pseudo DC voltage conversion or boosted DC voltage conversion.

Particular, in the embodiment of the invention, the converter unit 530 includes three or more interleaving converters.

As shown in FIG. 6, n converters 610a, 610b, ..., and 610n are connected in parallel to one another. The n converters 610a, 610b, ..., and 610n may have the same energy conversion capacity.

A 1/N component of current based on the DC input voltage Vpv is input to each of the n converters 610a, 610b, ..., and 610n and output current components of the n converters 610a, 610b, ..., and 610n are combined into one through output ends of the n converters 610a, 610b, ..., and 610n.

Meanwhile, the n converters 610a, 610b, ..., and 610n perform an interleaving operation in a state in which a current phase of the n converters 610a, 610b, ..., and 610n has a phase delay of +(360°/N) or −(360°/N) or a phase delay approximate thereto.

When the n converters 610a, 610b, ..., and 610n perform the interleaving operation as described above, a ripple of input current and output current of the converter unit 530 may be reduced. As a result, the capacity and size of circuit devices in the power conversion module 700 may be reduced.

Meanwhile, when two interleaving conductors are used as previously described, it is necessary for the inductor and the transformer to have a considerably large size in order to output AC voltage of about 290 W to 330 W as previously described. As the size of the inductor and the transformer is increased, it is necessary to increase the thickness of the junction box. The thickness of the junction box may be greater than that of a frame 105 of the solar cell module.

In order to solve the above problem, in the embodiment of the invention, three or more interleaving converters are used. In this instance, the size of the inductor and the transformer used to output AC voltage of about 290 W to 330 W as described above may be reduced and, therefore, the thickness of the junction box may be less than that of the frame 105 (see FIG. 3) of the solar cell module 100.

Meanwhile, a tap inductor converter or a flyback converter may be used as each of the interleaving converters.

Figure 7A:
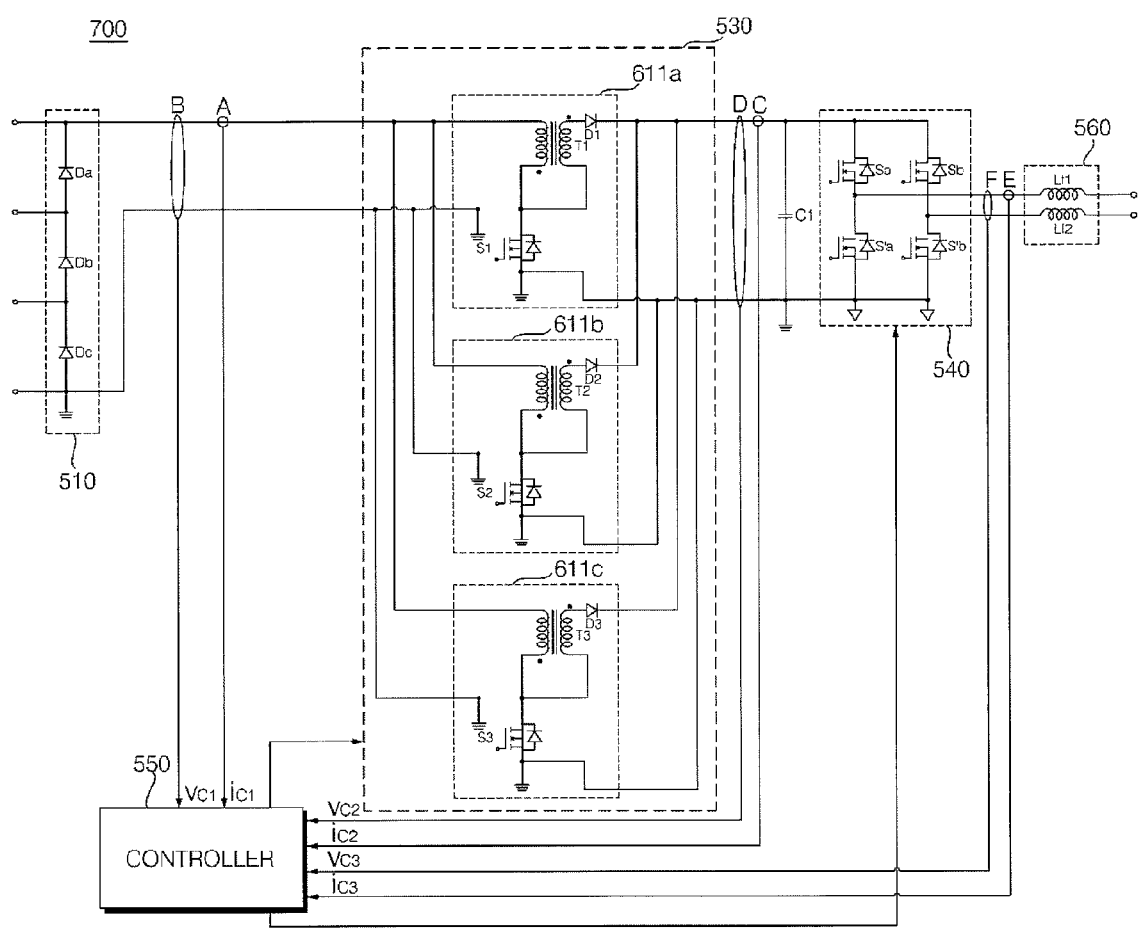
FIG. 7A is an internal circuit diagram of an example of the power conversion module of FIG. 6.

FIG. 7A is an internal circuit diagram of an example of the power conversion module of FIG. 6.

Referring to FIG. 7A, the power conversion module 700 may include a bypass diode unit 510, a converter unit 530, a DC end capacitor C1, an inverter unit 540, a controller 550, and a filter unit 560.

FIG. 7A illustrates that tap inductor converters are used as interleaving converters. As shown in FIG. 7A, the converter unit 530 includes first to third tap inductor converters 611a, 611b, and 611c.

The bypass diode unit 510 includes first to third bypass diodes Da, Db, and Dc respectively disposed between node a, node b, node c, and node d corresponding to first to fourth conductive lines 135a, 135b, 135c, and 135d, respectively.

The converter unit 530 may perform power conversion using DC voltage Vpv output from the bypass diode unit 510.

In particular, the first to third tap inductor converters 611a, 611b, and 611c output DC voltage converted through the interleaving operation to the DC end capacitor C1.

The first tap inductor converter 611a includes a tap inductor T1, a switching device S1 connected between the tap inductor T1 and a ground end, and a diode D1 connected to an output end of the tap inductor T1 to perform electric conduction in one direction. In addition, the DC end capacitor C1 is connected between an output end, i.e. a cathode, of the diode D1 and the ground end.

Specifically, the switching device S1 may be connected between a tap of the tap inductor T1 and the ground end. An output end (a secondary side) of the tap inductor T1 is connected to an anode of the diode D1 and the DC end capacitor C1 is connected between the cathode of the diode D1 and the ground end.

The primary side and the secondary side of the tap inductor T1 have opposite polarities. For this reason, the tap inductor T1 may be referred to as a switching transformer.

On the other hand, the primary side and the secondary side of the tap inductor T1 are connected to each other as shown in FIG. 7A. For this reason, the tap inductor converters may be non-insulative converters.

Meanwhile, when the three tap inductor converters 611a, 611b, and 611c are connected in parallel to one another such that the three tap inductor converters 611a, 611b, and 611c are operated in an interleaving mode as shown in FIG. 7A, input current is distributed in parallel. As a result, a ripple of current components output through the respective tap inductor converters 611a, 611b, and 611c is reduced.

The respective tap inductor converters 611a, 611b, and 611c may adaptively operated in response to a required power value of output AC voltage.

For example, when the required power value is about 90 W to 130 W, only the first tap inductor converter 611a may be operated. When the required power value is about 190 W to 230 W, only the first and second tap inductor converters 611a and 611b may be operated. When the required power value is about 290 W to 330 W, all of the first to third tap inductor converters 611a, 611b, and 611c may be operated. That is, the respective tap inductor converters 611a, 611b, and 611c may be selectively operated. The selective operation of the tap inductor converters 611a, 611b, and 611c may be controlled by the controller 550.

The inverter unit 540 converts the DC voltage level-converted by the converter unit 530 into AC voltage. FIG. 7A illustrates a full-bridge inverter. That is, upper arm switching devices Sa and Sb and lower arm switching devices S'a and S'b, which are connected in series in each other, form two pairs. The two pairs of the upper and lower arm switching devices are connected in parallel (Sa & S'a and Sb & S'b) to each other. A diode is connected in inverse parallel to each of the switching devices Sa, S'a, Sb, and S'b.

The switching devices in the inverter unit 540 turn on/off based on an inverter switching control signal from the controller 550. As a result, AC voltage having a predetermined frequency is output. The AC voltage may have the same frequency (about 60 Hz or 50 Hz) as an AC frequency.

The filter unit 560 performs low pass filtering to smooth the AC voltage output from the inverter unit 540. To this end, as shown in FIG. 7A, inductors Lf1 and Lf2 are provided. However, various other examples may be provided.

Meanwhile, a converter input current detection unit A detects current ic1 input to the converter unit 530 and a converter input voltage detection unit B detects voltage vc1 input to the converter unit 530. The detected input current ic1 and input voltage vc1 may be input to the controller 550.

A converter output current detection unit C detects current ic2 output from the converter unit 530 and a converter output voltage detection unit D detects voltage vc2, i.e. DC end voltage, output from the converter unit 530. The detected output current ic2 and output voltage vc2 may be input to the controller 550.

An inverter output current detection unit E detects current ic3 output from the inverter unit 540 and an inverter output voltage detection unit E detects voltage vc3 output from the inverter unit 540. The detected output current ic3 and output voltage vc3 may be input to the controller 550.

Meanwhile, the controller 550 may output a control signal to control the switching device S1 of the converter unit 530 shown in FIG. 7. In particular, the controller 550 may output a turn-on timing signal of the switching device S1 in the converter unit 530 based on at least one selected from among the detected input current ic1, input voltage vc1, output current ic2, output voltage vc2, output current ic3, and output voltage vc3.

On the other hand, the controller 550 may output an inverter control signal to control the respective switching devices Sa, S'a, Sb, and S'b of the inverter unit 540. In particular, the controller 550 may output a turn-on timing signal of the respective switching devices Sa, S'a, Sb, and S'b of the inverter unit 540 based on at least one selected from among the detected input current ic1, input voltage vc1, output current ic2, output voltage vc2, output current ic3, and output voltage vc3.

In addition, the controller 550 may calculate the maximum power point of the solar cell module 100 and control the converter unit 530 to output DC voltage corresponding to the maximum power.

Figure 7B:
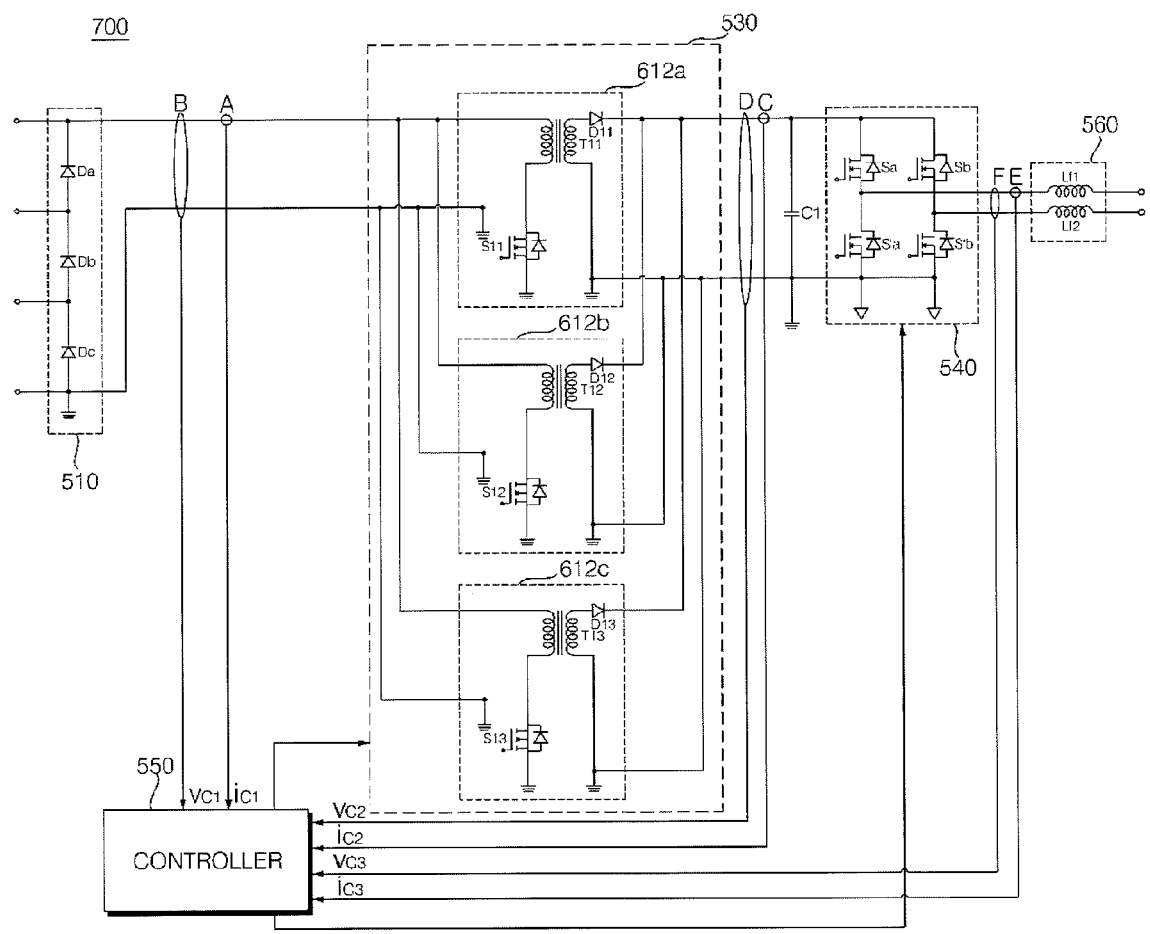
FIG. 7B is an internal circuit diagram of another example of the power conversion module of FIG. 6.

FIG. 7B is an internal circuit diagram of another example of the power conversion module of FIG. 6.

In the same manner as in the power conversion module 700 of FIG. 7A, the power conversion module 700 of FIG. 7B may include a bypass diode unit 510, a converter unit 530, a DC end capacitor C1, an inverter unit 540, a controller 550, and a filter unit 560.

However, FIG. 7B illustrates that flyback converters are used as interleaving converters of the converter unit 530. As shown in FIG. 7B, the converter unit 530 includes first to third flyback converters 612a, 612b, and 612c.

In particular, the first to third flyback converters 612a, 612b, and 612c are insulative converters unlike the non-insulative tap inductor converters. The first to third flyback converters 612a, 612b, and 612c output DC voltage converted through the interleaving operation to the DC end capacitor C1.

The first flyback converter 612a includes a transformer T11, a switching device S11 connected between a primary side of the transformer T11 and a ground end, and a diode D11 connected to a secondary side of the transformer T11 to perform electric conduction in one direction. In addition, the DC end capacitor C1 is connected between an output end, i.e. a cathode, of the diode D11 and the ground end. Meanwhile, the primary side and the secondary side of the transformer T11 have opposite polarities.

Figure 8B:
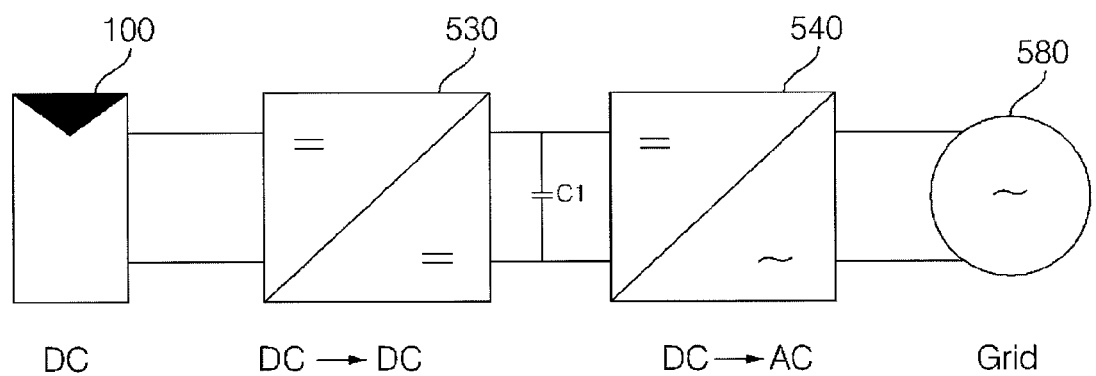

FIGS. 8A and 8B are views illustrating an operation method of the power conversion module of FIG. 6.

Referring first to FIG. 8A, the converter unit 530 of the power conversion module 700 according to the embodiment of the invention may convert DC voltage from the solar cell module 100 into pseudo DC voltage.

When the converter unit 530 is a tap inductor converter as shown in FIG. 7A or a flyback converter as shown in FIG. 7B, the converter unit 530 may convert DC voltage into pseudo DC voltage having an envelope, such as full-wave rectified DC voltage, according to switching on/off of the switching device (S1 or S11). The capacitor C1 may store the pseudo DC voltage.

Meanwhile, the inverter 540 receives the pseudo DC voltage, performs a switching operation for the received pseudo DC voltage, and outputs AC voltage. Specifically, the inverter 540 may convert the pseudo DC voltage having the envelope, such as the full-wave rectified DC voltage, into AC voltage having positive (+) and negative (−) polarities and output the AC voltage. In particular, the inverter 540 may convert the pseudo DC voltage into AC voltage corresponding to a grid frequency and output the AC voltage.

Next, referring to FIG. 8B, the converter unit 530 of the power conversion module 700 according to the embodiment of the invention may convert DC voltage from the solar cell module 100 into boosted DC voltage through level-conversion, specifically boosting.

When the converter unit 530 is a tap inductor converter as shown in FIG. 7A or a flyback converter as shown in FIG. 7B, the converter unit 530 may convert DC voltage Vp into boosted DC voltage according to switching on/off of the switching device (S1 or S11). The capacitor C1 may store the boosted DC voltage.

The inverter 540 receives the boosted DC voltage, performs a switching operation for the received boosted DC voltage, and outputs AC voltage. In particular, the inverter 540 may convert the boosted DC voltage into AC voltage corresponding to a grid frequency and output the AC voltage.

Figure 9A:
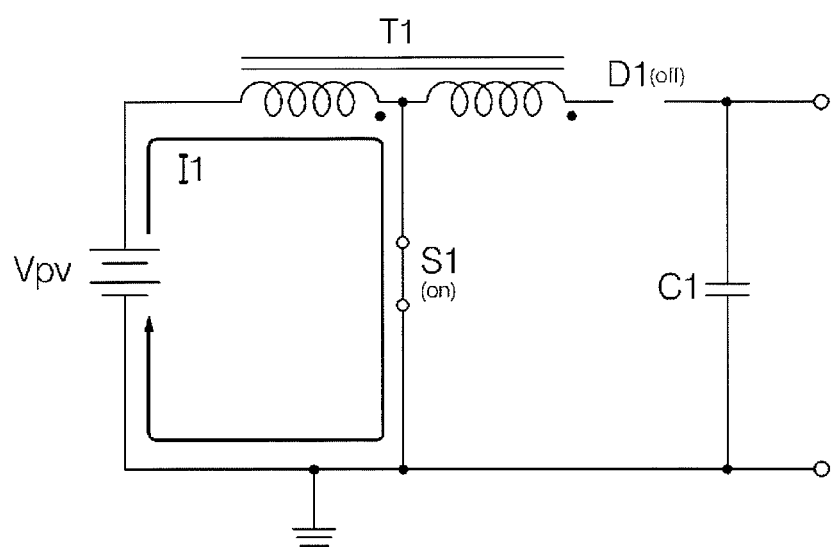
FIGS. 9A and 9B are reference views illustrating operation of a tap inductor converter shown in FIG. 7A.
Figure 9B:
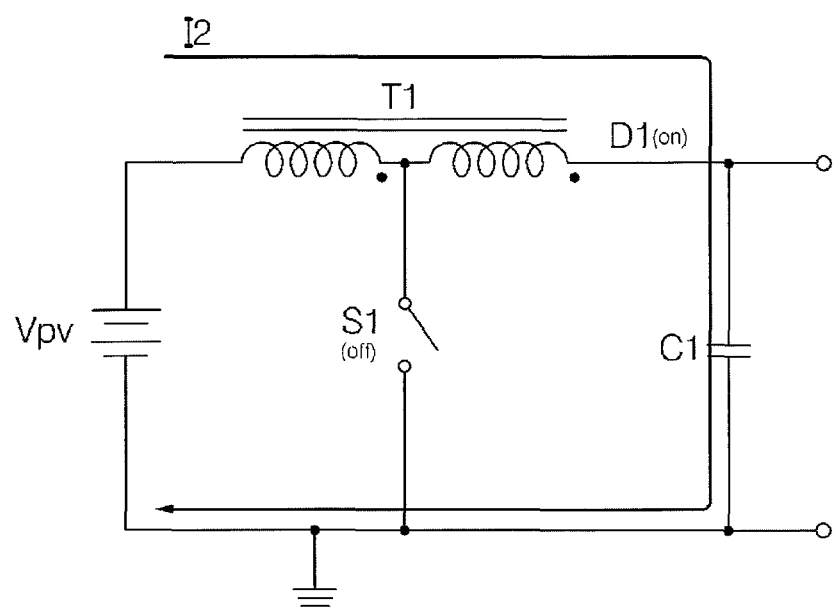

FIGS. 9A and 9B are reference views illustrating operation of the tap inductor converter shown in FIG. 7A.

The operation of the first tap inductor converter 611a will be described briefly. When the switching device S1 is turned on, a closed loop is formed by input voltage Vpv, the primary side of the tap inductor T1, and the switching device S1 as shown in FIG. 9A. And first current I1 flows in the closed loop. At this time, the diode D1 is not electrically conducted and turned off since the secondary side of the tap inductor T1 has a polarity opposite to that of the primary side of the tap inductor T1. As a result, the input voltage Vpv is stored in the primary side of the tap inductor T1.

When the switching device S1 is turned off, on the other hand, a closed loop is formed by the input voltage Vpv, the primary side and the secondary side of the tap inductor T1, the diode D1, and the capacitor C1 as shown in FIG. 9B. And second current I2 flows in the closed loop. At this time, the diode D1 is electrically conducted since the secondary side of the tap inductor T1 has a polarity opposite to that of the primary side of the tap inductor T1. As a result, the input voltage Vpv and energy stored in the primary side and the secondary side of the tap inductor T1 may be stored in the capacitor C1 via the diode D1.

As described above, the converter unit 530 may output pseudo DC voltage or high-efficiency, high-power DC voltage using the input voltage Vpv and the energy stored in the primary side and the secondary side of the tap inductor T1.

Figure 10A:
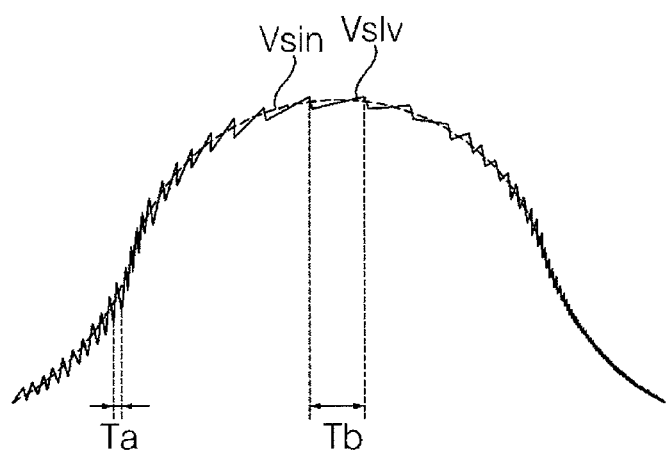
FIGS. 10A and 10B are reference views illustrating that a converter unit shown in FIG. 6 outputs pseudo direct current (DC) voltage using input voltage.
Figure 10B:
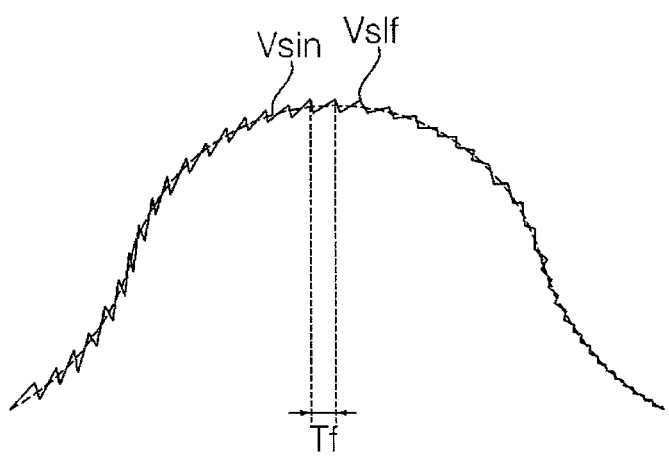

FIGS. 10A and 10B are reference views illustrating that the converter unit shown in FIG. 6 outputs pseudo DC voltage using input voltage.

Referring to FIGS. 6 and 10A, first to third interleaving converters 610a, 610b, and 610c in the converter unit 530 output pseudo DC voltage using input DC voltage Vpv.

Specifically, the converter unit 530 outputs pseudo DC voltage having a peak value of about 330 V using DC voltage of about 32 V to 36 V from the solar cell module 100.

To this end, the controller 550 decides a switching device duty of the first to third interleaving converters 610a, 610b, and 610c based on the detected input voltage Vpv and target output voltage Vdc.

In particular, as the input voltage Vpv is decreased, the switching device duty of the first to third interleaving converters 610a, 610b, and 610c is increased. In addition, as the input voltage Vpv is increased, the switching device duty of the first to third interleaving converters 610a, 610b, and 610c is decreased.

On the other hand, as the target output voltage Vdc is decreased, the switching device duty of the first to third interleaving converters 610a, 610b, and 610c is decreased. In addition, as the target output voltage Vdc is increased, the switching device duty of the first to third interleaving converters 610a, 610b, and 610c is increased. For example, when the target output voltage Vdc has a peak value of about 330 V, the switching device duty of the first to third interleaving converters 610a, 610b, and 610c may be the highest.

FIG. 10A illustrates a pseudo DC voltage waveform Vslv output according to change of the duty as described above. As shown in FIG. 10A, the pseudo DC voltage waveform Vs1ν follows a target sine waveform V sin.

Meanwhile, in the embodiment of the invention, the switching frequency of the converter unit 530 is changed such that the pseudo DC voltage waveform Vslv more accurately follows the full-wave rectified waveform V sin.

An error ΔE2 between a pseudo DC voltage waveform Vs1ƒ and a target sine waveform V sin when the switching frequency of the converter unit 530 is fixed as shown in FIG. 10B is greater than an error ΔE1 between the pseudo DC voltage waveform Vslv and the target sine waveform V sin when the switching frequency of the converter unit 530 is changed as shown in FIG. 10A.

In the embodiment of the invention, the switching frequency of the converter unit 530 is changed in order to reduce such an error. That is, the switching frequencies of the switching devices of the first to third interleaving converters 610a, 610b, and 610c are changed.

The controller 550 may control the switching frequency of the converter unit 530 to be increased, i.e. the switching period of the converter unit 530 to be decreased, as a change rate of the target sine waveform V sin is increased. On the other hand, the controller 550 may control the switching frequency of the converter unit 530 to be decreased, i.e. the switching period of the converter unit 530 to be increased, as the change rate of the target sine waveform V sin is decreased.

FIG. 10A illustrates that the switching period of the converter unit 530 is set to Ta in a rising period of the target sine waveform V sin and the switching period of the converter unit 530 is set to Tb, which is greater than Ta, in a peak period of the target sine waveform V sin. That is, FIG. 10A illustrates that the switching frequency corresponding to the switching period Ta is higher than the switching frequency corresponding to the switching period Tb. As a result, it is possible to reduce the error ΔE1 between the pseudo DC voltage waveform Vslv and the target sine waveform V sin.

Meanwhile, change of the switching frequency in FIG. 10A may be described based on a switching mode of the switching device, which will hereinafter be described with reference to FIGS. 11 and 12.

Figure 11:
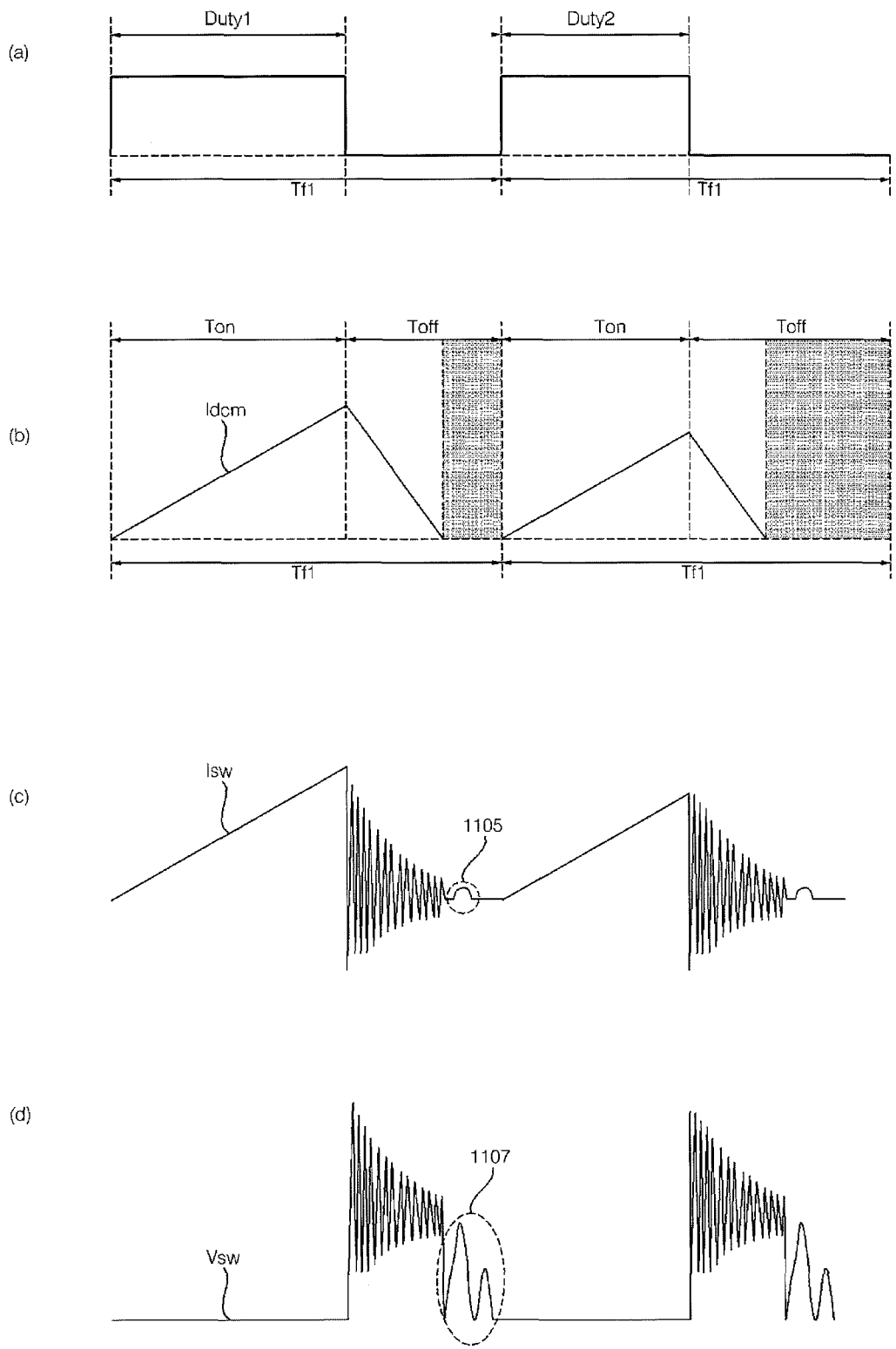
FIGS. 11 and 12 are reference views illustrating change of a switching frequency according to a switching mode of a switching device.
Figure 12:
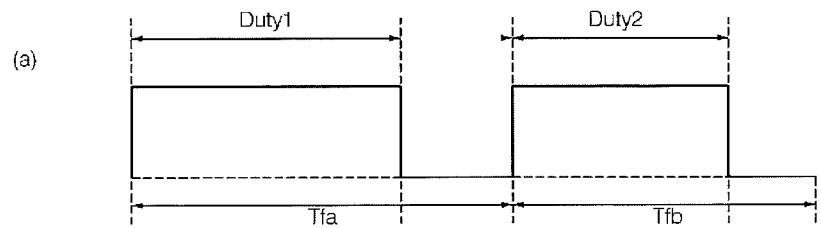
Figure 12:
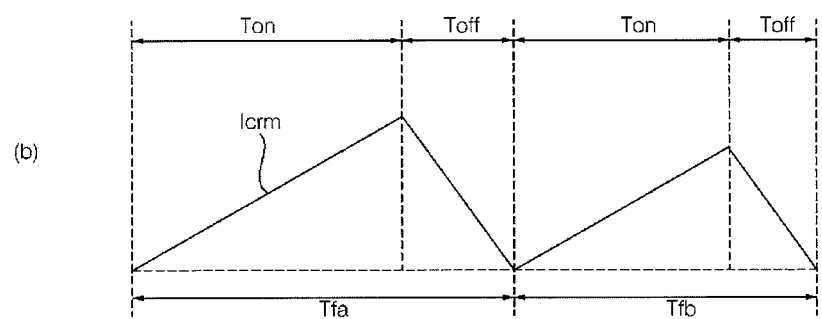
Figure 12:
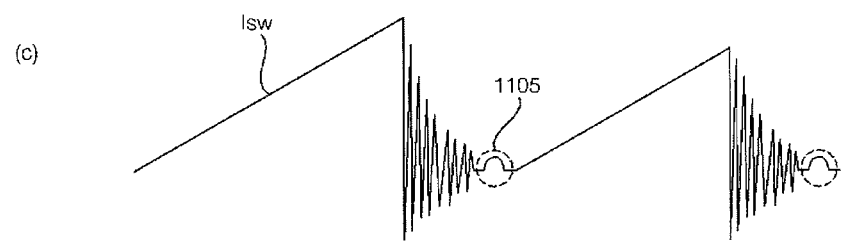
Figure 12:
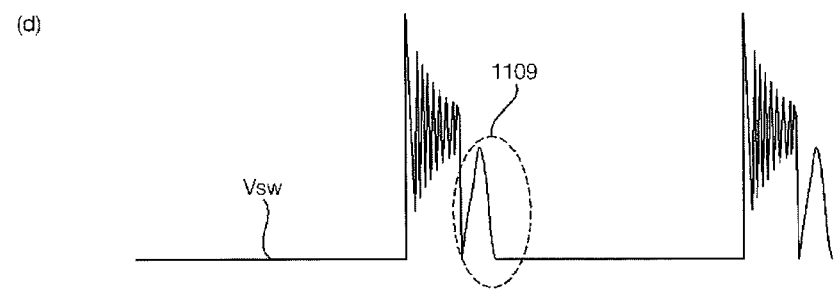

FIGS. 11 and 12 are reference views illustrating change of the switching frequency according to the switching mode of the switching device.

First, FIG. 11(a) illustrates an example of a duty waveform of the switching device of the interleaving converter. Referring to FIG. 11(a), the switching device is turned on during a first duty duty1 of a first switching period Tf1 and then turned off. In addition, the switching device is turned on during a second duty duty2 of a second switching period Tf2 and then turned off. As shown in FIG. 11(a), the first duty duty1 is greater than the second duty duty2.

On the other hand, FIG. 11(a) illustrates that the switching period of the interleaving converter is fixed and a discontinuous conduction mode (DCM) is applied as the switching mode.

FIG. 11(b) illustrates a waveform Idcm of current flowing in the switching device when the switching period of the interleaving converter is fixed and the DCM mode is applied as the switching mode. As the switching device is turned on, the current flowing in the switching device is increased. As the switching device is turned off, the current flowing in the switching device is decreased.

FIG. 11(c) illustrates a waveform of real current flowing in the switching device of the interleaving converter in the DCM mode and FIG. 11(d) illustrates switching voltage at both ends of the switching device of the interleaving converter in the DCM mode.

On the other hand, a resonance period 1105 may be generated in the interleaving converter after the switching device is turned off and before the next switching period is commenced. At this time, a period 1107 in which the switching voltage at both ends of the switching device is not 0 is generated when the switching device is operated in the DCM mode. Consequently, zero voltage switching (ZVS) for the switching device is not performed with the result that efficiency of the interleaving converter is decreased.

In the embodiment of the invention, a critical conduction mode (CRM) is used as the switching mode instead of DCM in order to solve the above problem. The CRM mode may be referred to as a boundary conduction mode (BCM) or a transition mode (TM).

The CRM mode means a mode in which the switching period is commenced whenever current flowing in the switching device of the interleaving converter is 0 after the switching device is turned off. In the CRM mode, therefore, the switching period may be changed according to the duty of the switching period.

FIG. 12(a) illustrates an example of a duty waveform of the switching device of the interleaving converter. Referring to FIG. 12(a), the switching device is turned on during a first duty duty1 of a first switching period Tfa and then turned off. In addition, the switching device is turned on during a second duty duty2 of a second switching period Tfb and then turned off. As shown in FIG. 12(a), the first duty duty1 is greater than the second duty duty2.

On the other hand, FIG. 12(a) illustrates that the switching period of the interleaving converter is changed according to change of the duty and, therefore, the CRM mode, in which the switching frequency is changed, is applied as the switching mode.

FIG. 12(b) illustrates a waveform Icrm of current flowing in the switching device when the CRM mode, in which the switching frequency is changed, is applied as the switching mode. As the switching device is turned on, the current flowing in the switching device is increased. As the switching device is turned off, the current flowing in the switching device is decreased.

FIG. 12(c) illustrates a waveform of real current flowing in the switching device of the interleaving converter in the CRM mode and FIG. 12(d) illustrates switching voltage at both ends of the switching device of the interleaving converter in the CRM mode.

On the other hand, a resonance period 1105 may be generated in the interleaving converter after the switching device is turned off. At this time, a time when the current flowing in the switching device is 0 may be decided and the switching device may be turned on at the time when the current flowing in the switching device is 0, i.e. at the time of zero crossing, although the resonance period 1105 is generated in the interleaving converter when the switching device is operated in the CRM mode. Consequently, zero voltage switching (ZVS) for the switching device is performed with the result that efficiency of the interleaving converter is increased.

In the embodiment of the invention, therefore, the switching frequency of the switching device of the interleaving converter is changed in the CRM mode.

When three interleaving converters 610a, 610b, and 610c are used as shown in FIG. 6, on the other hand, the first to third interleaving converters 610a, 610b, and 610c may be operated while having phase differences between the first to third interleaving converters 610a, 610b, and 610c.

At this time, when predetermined phase differences, e.g. phase differences of 120 degrees, are set between the operation sections of the first to third interleaving converters 610a, 610b, and 610c in a state in which change of the switching frequencies is applied, output power may be lowered if the switching periods are lengthened, which will hereinafter be described with reference to FIGS. 13 and 14.

Figure 13:
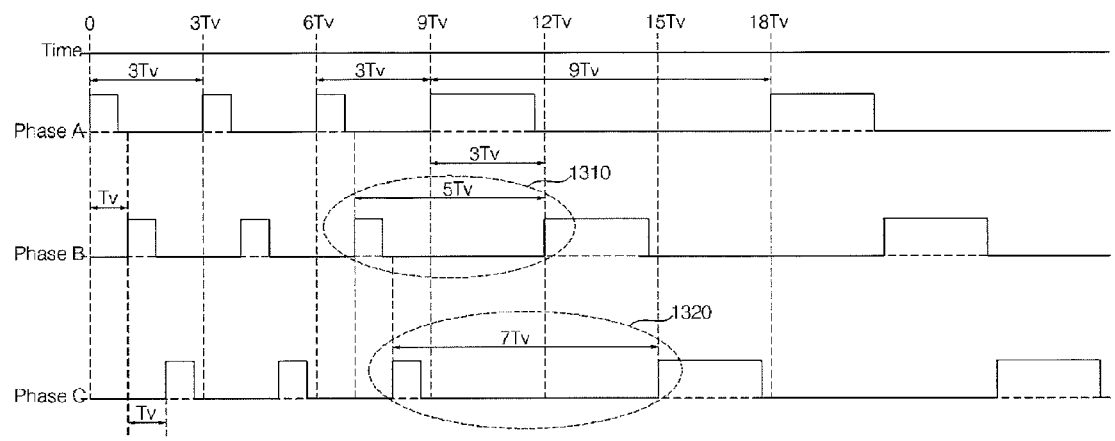
FIG. 13 is a view showing an instance in which switching frequencies of three interleaving converters are changed and phase differences between the three interleaving converters are fixed.

FIG. 13 illustrates an instance in which the switching frequencies of the three interleaving converters 610a, 610b, and 610c are changed and the phase differences between the three interleaving converters 610a, 610b, and 610c, are fixed.

Referring to FIG. 13, the switching periods of the three interleaving converters 610a, 610b, and 610c are fixed (3Tv) time 0 to time 9Tv and the phase differences between the three interleaving converters 610a, 610b, and 610c, i.e. the differences between phases (phase a, phase b, and phase c) of the three interleaving converters 610a, 610b, and 610c, are Tv.

The switching periods of the three interleaving converters 610a, 610b, and 610c are changed at the next time 9Tv with the result that the switching periods of the three interleaving converters 610a, 610b, and 610c are increased by three times (9Tv). In this instance, the first interleaving converter is operated during the time section of 3Tv after the time section of 3Tv. The second interleaving converter is operated during the time section of 3Tv after the time section of 5Tv in consideration of the changed duty (3Tv) of the first interleaving converter. The third interleaving converter is operated during the time section of 3Tv after the time section of 7Tv in consideration of the changed duty (3Tv) of the second interleaving converter.

At this time, the phase differences between the first to third interleaving converters 610a, 610b, and 610c are fixed to 120 degrees although the switching periods of the three interleaving converters 610a, 610b, and 610c are changed. That is, the first interleaving converter is operated and then the second interleaving converter is operated after the time section of 3Tv. In addition, the first interleaving converter is operated and then the third interleaving converter is operated after the time section of 6Tv.

In the switching period change sections 1310 and 1320, power output from the second interleaving converter and the third interleaving converter is lower than that power output from the first interleaving converter. As a result, output current or output voltage from the converter unit 530 is instantaneously lowered.

In order to solve the above problem, in the embodiment of the invention, phases for the operation section of the interleaving converters are changed to avoid output unbalance between the interleaving converters during change of the switching periods of the interleaving converters, which will hereinafter be described with reference to FIG. 14.

Figure 14:
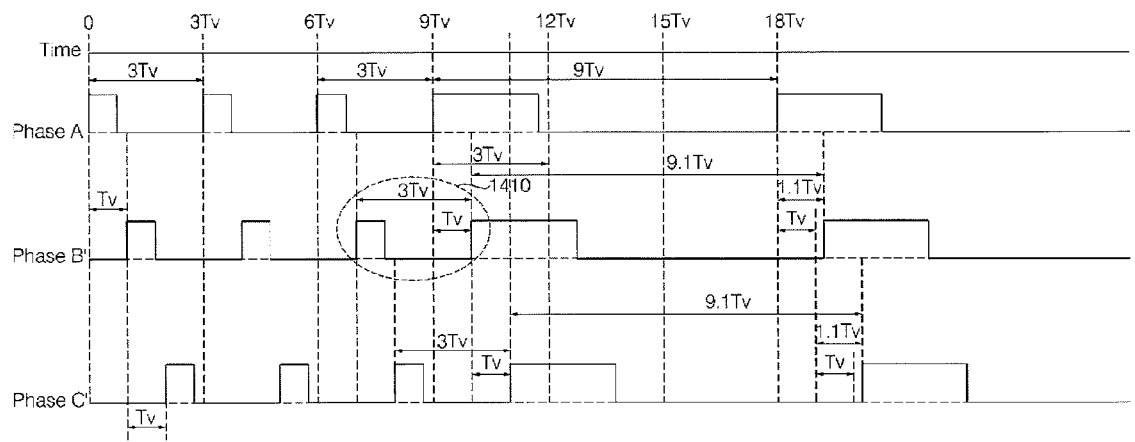
FIG. 14 is a view showing an instance in which the switching frequencies of the three interleaving converters and the phase differences between the three interleaving converters are changed.

FIG. 14 is a view showing an instance in which the switching frequencies of the three interleaving converters 610a, 610b, and 610c and the phase differences between the three interleaving converters 610a, 610b, and 610c are changed.

Referring to FIG. 14, the switching periods of the three interleaving converters 610a, 610b, and 610c are fixed (3Tv) from time 0 to time 9Tv and the phase differences between the three interleaving converters 610a, 610b, and 610c, i.e.

the differences between phases (phase a, phase b, and phase c) of the three interleaving converters 610a, 610b, and 610c, are Tv.

The switching periods of the three interleaving converters 610a, 610b, and 610c are changed at the next time 9Tv with the result that the switching periods of the three interleaving converters 610a, 610b, and 610c are increased by three times (9Tv). In this instance, the first interleaving converter is operated during the time section of 3Tv after the time section of 3Tv. In a switching period change section 1410, the second interleaving converter is operated during the time section of 3Tv after the time section of 3Tv from the switching period change time 9Tv and the third interleaving converter is operated during the time section of 3Tv after the time section of 6Tv from the switching period change time 9Tv.

That is, unlike FIG. 13, the controller 550 changes the phase differences between the first to third interleaving converters 610a, 610b, and 610c in response to the changed periods of the three interleaving converters 610a, 610b, and 610c. As shown in FIG. 14, the phase difference between the first and second interleaving converters 610a and 610b and the phase differences between the second and third interleaving converters 610a and 610c are changed from 120 degrees to 40 degrees.

When the switching periods of the three interleaving converters 610a, 610b, and 610c are increased, the controller 550 may vary the phases of the first to third interleaving converters 610a, 610b, and 610c such that the phase differences between the first to third interleaving converters 610a, 610b, and 610c are decreased. In the similar manner, when the switching periods of the three interleaving converters 610a, 610b, and 610c are decreased, the controller 550 may vary the phases of the first to third interleaving converters 610a, 610b, and 610c such that the phase differences between the first to third interleaving converters 610a, 610b, and 610c are increased, for example from 120 degrees to 130 degrees.

On the other hand, when the switching periods of the three interleaving converters 610a, 610b, and 610c are increased, the controller 550 may vary the phases of the first to third interleaving converters 610a, 610b, and 610c such that an overlapping region is present between the operation sections of the interleaving converters, particularly the overlapping region between the operation sections of the interleaving converters is increased. FIG. 14 illustrates that the operation sections of the first interleaving converter and the second interleaving converter overlap during the time section of about 2Tv.

After the switching periods of the three interleaving converters 610a, 610b, and 610c are changed, at time 18Tv, the first interleaving converter may be operated during the time section of 3Tv after the time section of 9Tv, the second interleaving converter may be operated during the time section of 3Tv after the time section of 9.1Tv, and third interleaving converter may be operated during the time section of 3Tv after the time section of 9.1Tv.

After the changed switching periods of the three interleaving converters 610a, 610b, and 610c, the controller may vary the phase differences between the first to third interleaving converters 610a, 610b, and 610c such that the phase differences between the first to third interleaving converters 610a, 610b, and 610c are approximate to a reference phase difference. As shown in FIG. 14, the phase difference between the first and second interleaving converters 610a and 610b and the phase differences between the second and third interleaving converters 610a and 610c after time 18Tv are increased from 40 degrees to about 41 degrees.

When the phase differences between the first to third interleaving converters 610a, 610b, and 610c are sequentially controlled to be approximate to the reference phase difference, i.e. 120 degrees, as described above, it is possible to prevent current distortion and, in addition, to prevent reduction of power output from the second interleaving converter and the third interleaving converter.

Meanwhile, the phase change as described above is effective only when at least three interleaving converters are used. When two interleaving converters are used, on the other hand, the interleaving converters may have a fixed phase of 180 degrees as shown in FIG. 12.

The switching frequency change and the phase change described with reference to FIGS. 10A to 14 may be applied to the converter unit 530. In particular, the switching frequency change and the phase change may be applied to the converter unit 530 when the converter unit 530 is a tap inductor converter as shown in FIG. 7A or a flyback converter as shown in FIG. 7B.

The photovoltaic module according to the embodiment of the invention may not be limitedly applied to the construction and method of the embodiments as previously described; however, all or some of the embodiments may be selectively combined to achieve various modifications.

As is apparent from the above description, according to embodiments of the invention, a photovoltaic module may be configured such that a junction box, which has a power conversion module including a converter unit including at least three interleaving converters and an inverter unit, is attached to the rear surface of a solar cell module. Consequently, it is possible to directly stably output AC voltage from the photovoltaic module.

In particular, the converter unit includes the at least three interleaving converters and, therefore, it is possible to reduce the size of the circuit devices, particularly an inductor and a transformer, in the converter unit while output high-power AC voltage. As a result, the thickness of a junction box may be less than that of a frame of the solar cell module.

Meanwhile, the at least three interleaving converters perform interleaving operation to reduce a ripple of input current and output current of the converter unit. As a result, the capacity and size of the circuit devices in the power conversion module may be reduced.

According to the embodiments of the invention, on the other hand, the converter unit may output pseudo DC voltage. To this end, the switching frequencies of the interleaving converters may be changed. Consequently, it is possible to output pseudo DC voltage more approximate to a sine wave.

Meanwhile, the interleaving converters may vary switching frequencies of switching devices in response to change of duties of the switching devices. In particular, the switching devices may be operated in a CRM mode. In this instance, it is possible to perform zero voltage switching for the switching devices with the result that power conversion efficiency of the converter unit is increased.

On the other hand, differences between operation sections of the at least three interleaving converters, i.e. phase differences between the interleaving converters, may be changed. In this instance, it is possible to prevent instantaneous reduction of output power due to change of switching frequencies of the interleaving converters.

In addition, the phase differences between the interleaving converters are sequentially restored to a reference phase difference after the change of the switching frequencies of the interleaving converters, thereby preventing distortion of output, current and, in addition, preventing reduction of output power of the interleaving converters.

Although the example embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A photovoltaic module comprising:
a solar cell module comprising a plurality of solar cells; and
a junction box attached to a rear surface of the solar cell module, the junction box comprising a power conversion module to convert direct current (DC) voltage supplied from the solar cell module into alternating current (AC) voltage and to output the AC voltage,
wherein the power conversion module comprises:
at least one bypass diode to receive the DC voltage from the solar cell module;
a converter unit to power-convert the DC voltage from the at least one bypass diode, the converter unit comprising at least three interleaving converters;
a capacitor to store voltage output from the converter unit;
an inverter unit to output the AC voltage using the voltage stored in the capacitor; and
a controller to control operations of the converter unit and the inverter unit,
wherein the solar cell module includes a frame to fix an edge of the solar cell module and the junction box has a smaller thickness than the frame, and
wherein, when a current flowing in switching devices of the at least three interleaving converters or a voltage applied to the switching devices is zero-crossed after the switching devices of the at least three interleaving converters are turned on and off, the controller turns on the switching devices again.

2. The photovoltaic module according to claim 1, wherein the power conversion module further comprises:
an input voltage detection unit to detect voltage input to the converter unit;
an input current detection unit to detect current input to the converter unit;
a DC end voltage detection unit to detect voltage input to the capacitor;
an output voltage detection unit to detect voltage output from the inverter unit; and
the controller to control a switching operation of the converter unit based on the detected input voltage, input current, and DC end voltage, and to control a switching operation of the inverter unit based on the detected DC end voltage and output voltage.

3. The photovoltaic module according to claim 1, wherein the converter unit power-converts the DC voltage from the at least one bypass diode to output a pseudo DC voltage, and the inverter unit power-converts the pseudo DC voltage to output the AC voltage.

4. The photovoltaic module according to claim 1, wherein the controller changes switching frequencies of the at least three interleaving converters.

5. The photovoltaic module according to claim 4, wherein the controller controls the switching frequencies of the at least three interleaving converters to be increased, as a change rate of a target sine waveform for a pseudo DC voltage output from the converter unit is increased.

6. The photovoltaic module according to claim 1, wherein the controller changes switching periods of the at least three interleaving converters and changes phase differences between the at least three interleaving converters during operation sections of the at least three interleaving converters, after change of the switching periods of the at least three interleaving converters.

7. The photovoltaic module according to claim 6, wherein, when the switching periods of the at least three interleaving converters are increased, the controller changes the phase differences between the at least three interleaving converters during the operation sections of the at least three interleaving converters, such that the phase differences between the at least three interleaving converters during the operation sections of the at least three interleaving converters are less than the phase differences between the at least three interleaving converters during the operation sections of the at least three interleaving converters before the increase of the switching periods of the at least three interleaving converters.

8. The photovoltaic module according to claim 6, wherein the controller changes the phase differences between the at least three interleaving converters during the operation sections of the at least three interleaving converters, such that the phase differences between the at least three interleaving converters during the operation sections of the at least three interleaving converters are sequentially approximate to a reference phase difference after the change of the switching periods of the at least three interleaving converters.

9. The photovoltaic module according to claim 6, wherein, when the switching periods of the at least three interleaving converters are increased, the controller increases an overlapping region between the operation sections of the at least three interleaving converters.

10. The photovoltaic module according to claim 1, wherein the controller selectively operates at least one of the at least three interleaving converters.

11. The photovoltaic module according to claim 1, wherein each of the at least three interleaving converters comprises a tap inductor converter.

12. The photovoltaic module according to claim 1, wherein each of the at least three interleaving converters comprises a flyback converter.

13. A photovoltaic module comprising:
a solar cell module comprising a plurality of solar cells; and
a junction box attached to a rear surface of the solar cell module, the junction box comprising a power conversion module to power-convert DC voltage supplied from the solar cell module and to output the power-converted DC voltage,
wherein the power conversion module comprises:
at least one bypass diode to receive the DC voltage from the solar cell module;
a converter unit to convert the DC voltage from the at least one bypass diode, the converter unit comprising a plurality of interleaving converters; and
a controller to control the converter unit, and wherein the controller changes switching periods of switching devices of the interleaving converters,
wherein the controller changes the switching periods of the switching devices of the interleaving converters based on whether a current flowing in the switching devices or a voltage applied to both ends of the switching devices is zero-crossed after the switching devices are turned on and off.

14. The photovoltaic module according to claim 13, wherein the converter unit power-converts the DC voltage to output a pseudo DC voltage, and the controller changes the switching periods of the switching devices of the interleaving converters based on duties to drive the switching devices of the interleaving converters and sets the switching periods of the switching devices of the interleaving converters to be increased in proportion to an increase of the duties.

15. The photovoltaic module according to claim 13, wherein the converter unit power-converts the DC voltage to output a pseudo DC voltage, and the controller controls the converter unit such that the output pseudo DC voltage follows a target sine waveform and sets the switching periods of the converter unit to be decreased in inverse proportion to an increase of a change rate of the target sine waveform.

16. The photovoltaic module according to claim 13, wherein the converter unit comprises at least three interleaving converters.

* * * * *